(12) United States Patent
Abrams et al.

(10) Patent No.: US 8,380,715 B2
(45) Date of Patent: Feb. 19, 2013

(54) SYSTEM, METHOD AND COMPUTER PROGRAM PRODUCT FOR MANAGING AND ORGANIZING PIECES OF CONTENT

(75) Inventors: William M. Abrams, Searcy, AK (US); Ricky Lee Johnson, Scottsdale, AZ (US)

(73) Assignee: Vital Source Technologies, Inc., Raleigh, NC (US)

( * ) Notice: Subject to any disclaimer, the term of this patent is extended or adjusted under 35 U.S.C. 154(b) by 0 days.

(21) Appl. No.: 10/860,994

(22) Filed: Jun. 4, 2004

(65) Prior Publication Data
US 2005/0278310 A1 Dec. 15, 2005

(51) Int. Cl.
*G06F 7/00* (2006.01)
*G06F 17/30* (2006.01)
(52) U.S. Cl. .................................. 707/737; 707/752
(58) Field of Classification Search ............... 707/4, 100
See application file for complete search history.

(56) References Cited

U.S. PATENT DOCUMENTS

| | | | |
|---|---|---|---|
| 6,446,061 B1 | 9/2002 | Doerre et al. | |
| 6,941,302 B1 * | 9/2005 | Suchter | 707/5 |
| 7,039,645 B1 * | 5/2006 | Neal et al. | 1/1 |
| 7,054,841 B1 * | 5/2006 | Tenorio | 705/57 |
| 2001/0049677 A1 * | 12/2001 | Talib et al. | 707/3 |
| 2002/0103602 A1 | 8/2002 | Meng | |
| 2003/0055567 A1 | 3/2003 | Kelly | |
| 2003/0055832 A1 | 3/2003 | Roccaforte | |
| 2003/0061060 A1 | 3/2003 | Tenorio | |
| 2003/0120662 A1 * | 6/2003 | Vishik | 707/100 |
| 2003/0126561 A1 * | 7/2003 | Woehler et al. | 715/531 |
| 2003/0182268 A1 | 9/2003 | Lal | |
| 2004/0024739 A1 * | 2/2004 | Copperman et al. | 707/1 |
| 2004/0034615 A1 | 2/2004 | Thomson et al. | |
| 2004/0059736 A1 * | 3/2004 | Willse et al. | 707/100 |
| 2004/0088322 A1 * | 5/2004 | Elder et al. | 707/103 Y |
| 2004/0167887 A1 * | 8/2004 | Wakefield et al. | 707/3 |
| 2004/0267779 A1 * | 12/2004 | Carter et al. | 707/100 |

FOREIGN PATENT DOCUMENTS
| | | |
|---|---|---|
| WO | WO 00/08909 | 2/2000 |
| WO | WO 03/088092 A1 | 10/2003 |

OTHER PUBLICATIONS

B. Rosenblatt, B. Trippe, S. Mooney; *Digital Rights Management*; 2002; pp. 79-88, 95-96; Chapter 5, *DRM Building Blocks: Protecting and Tracking Contents*; M&T Books; XP002341140; New York.

* cited by examiner

*Primary Examiner* — Cheryl Lewis
*Assistant Examiner* — Raheem Hoffler
(74) *Attorney, Agent, or Firm* — Merchant & Gould P.C.

(57) ABSTRACT

A system for managing and organizing content includes a source capable of operating at least one application (i.e., content manager, taxonomy manager, etc.). The application (s) are capable of providing a plurality of pieces of content and a plurality of master taxonomies, each master taxonomy including at least one piece of content placed at one or more locations. After providing the pieces of content and the master taxonomies, the application(s) can identify a subset of the pieces of content and at least one master taxonomy, where the subset includes at least one piece of content. The application (s) can then generate at least one client taxonomy based upon the identified subset and the master taxonom(ies) such that the subset of the pieces of content can thereafter be organized in the client taxonom(ies). The system can also include a client capable of organizing the subset in the client taxonom (ies).

34 Claims, 3 Drawing Sheets

SYSTEM, METHOD AND COMPUTER PROGRAM PRODUCT FOR MANAGING AND ORGANIZING PIECES OF CONTENT

FIELD OF THE INVENTION

The present invention generally relates to systems and methods for managing and organizing content and, more particularly, relates to systems, methods and computer program products for managing and organizing content into at least one taxonomy.

BACKGROUND OF THE INVENTION

In today's educational climate, an increasing number of persons seek knowledge and further education regarding a truly diverse and wide variety of subjects. As can be appreciated, education and training takes a wide variety of forms. Education starts at a very young age and extends through high school. Thereafter, persons may attend any of a variety of universities, colleges or technical centers. However, education and training is not limited to these formal environments. Illustratively, many companies, agencies and other entities implement training programs to train people with the skills those people need for their respective jobs. Additionally, after receiving a college education, many persons, in an increasingly greater rate, attend some type of graduate school. Graduate schools may include medical school, law school and business school, as well as a wide variety of other advanced curriculums. Even after such higher educations, for example, persons still attend conferences, seminars and other organized meetings to exchange information and ideas.

Accordingly, education and training are present in our lives from a very young age and might never end for some persons. As described above, this education takes a wide variety of forms. However, one common thread running through this education is the necessity to convey information from persons and materials that possess the knowledge, to persons wanting the knowledge. The persons providing the knowledge will hereinafter be referred to as "teachers," with those persons receiving the knowledge referred to as "students."

The training environment of a medical student provides insight into the presently used teaching methods. Typically, a medical student starts his or her education with the hope of being enriched by the knowledge he or she seeks. Typically, a medical student may walk into a classroom and, from day one, the lights go out and the slides start flashing on the screen. The rate at which the slides are shown may average as much as 180 slides per hour. Nevertheless, the slides pass by in front of the medical student and she is expected to digest this information.

The information used in teaching may come from numerous sources. For example, the slides shown to the medical students may be the result of years of collecting by a professor. Further, the slides may be one of a kind that the professor obtained from the professor's mentor, who used to be chairman of their department before he retired.

The students correctly perceive those slides as being of tremendous value. However, the students see the slides one time, and only one time, and then the slides are gone forever. After class, then, the students attempt to conjure up the slides either working alone or in groups. The students often unsuccessfully attempt to draw the slides when they are displayed in class. But before the essence of the slide is really captured, the next slide is being displayed. Then, after class the students might approach the professor and humbly request a copy of the slides. However, the slides often represent the career of the professor. As a result, the professor is hesitant to assist in a reproduction of his documents in any form.

The above scenario illustrates one of a variety of situations that prevent the exchange of information and knowledge from a teacher to a student. Accordingly, the scenario results in the students recreating the knowledge to which they were exposed. This recreation might be in the form of notes or crude reproductions of the slides, or whatever other information was presented in class that day. Accordingly, there is a need to provide a method to exchange knowledge from a teacher to a student that is both beneficial and acceptable to all parties.

Alternatively, a situation may be present when the teacher does indeed prepare and provide materials to the students. However, even in this situation there are common problems. For example, a teacher may copy a favorite diagram from a resource book and paste that diagram into their own created materials. The teacher may then surround this copied diagram with the teacher's own text. This, for one, results in potential copyright infringement violations. Also, with the advent of desktop publishing capabilities, the accumulation of these materials is becoming progressively easier. The student accurately perceives this material as coming straight from the professor and, as a result, considers the material of great value. In addition, the university, for example, may require the student to purchase the professor's material. Alternatively, the university will recommend that the student buy a series of materials from a particular publisher.

Accordingly, a situation has developed in the academic world, and in other learning environments, in which administrative persons, faculty members and students are discouraged and concerned with regard to the decreasing quality of their study materials. People are discouraged both from the perspective of a teacher, providing the materials, and from the perspective of a student, receiving the materials. For students, the situation is particularly discouraging in that their command of the material, in testing situations as well as other situations, will dictate the success of their careers.

To address the aforementioned issues, systems have been developed to effectively collect information from a wide variety of sources and provide one or more items of material from this collection to students in an efficient manner. In accordance with one such system, an entire educational curriculum for an organization can be made available to a user in a readily accessible collection. That is, a collection can be characterized as global to a particular organization, such as a college or corporation, including all curriculum materials that the particular organization utilizes. The system can then provide for navigation of information in the collection to thereby permit a user to interact with one or more items of material in the collection as if those item(s) were single textbook(s), journal (s), video(s) or treatise(s), for example.

In such systems, as well as systems where a user generally has access to a number of different materials in a collection, there are some challenges with the organization of such materials. In this regard, different users may desire a different taxonomy with respect to organization of materials within a collection of materials. More particularly, different users may desire to systematically arrange the materials of a collection in groups or categories according to different criteria. For example, users may desire to have the materials of the user's collection organized in accordance with well know taxonomies such as the Dewey Decimal Classification and/or the Library of Congress Classification. Also, for example, users may desire to have the materials organized in accordance with taxonomies based upon the subject matter and/or genre of the materials. In yet another example, users may desire to have the materials organized in accordance with one or more taxonomies more specific to the user, such as a taxonomy specific to the user's college (e.g., New York University course catalog) and/or a taxonomy specific to another organization to which the user belongs (e.g., American Bar Association).

Although systems have been developed that provide a collection of materials, such conventional systems typically organize all of the materials in accordance with a single given taxonomy, irrespective of the users receiving the collection. To organize the materials in accordance with a different desired taxonomy, users are typically required to manually organize such materials. Then, as the user's collection increases to include additional materials, the user is again required to manually place the additional materials within the user's desired taxonomy. Thus, it would be desirable to design a system and method of automatically placing materials of a collection into different taxonomies for different users without requiring the users or the source of the collection to manually organize the materials, and manually place additional materials within a manually organized collection.

SUMMARY OF THE INVENTION

In light of the foregoing background, embodiments of the present invention present an improved system, method and computer program product for managing and organizing content. The system, method and computer program product of embodiments of the present invention are capable of maintaining a plurality of different master taxonomies. The same or different subsets of a plurality of pieces of content can then be organized in one or more of the master taxonomies by generating one or more client taxonomies based upon the subset of content and the master taxonom(ies). In this regard, the same or different subsets of content can be thereafter provided to different clients, which can thereafter organize the same or different subsets in one or more different manners based upon the client taxonom(ies). Thus, the system, method and computer program product of embodiments of the present invention are capable of placing materials of a collection into different taxonomies for different clients without requiring the clients or the source of the collection to manually organize the materials, or manually place additional materials within a manually organized collection.

According to one aspect of the present invention, a system is provided for managing and organizing content. The system includes a source capable of operating at least one application (i.e., content manager, taxonomy manager, etc.). The application(s) are capable of providing a plurality of pieces of content, such as from a content database of the source. In addition, the application(s) are capable of providing a plurality of master taxonomies, such as from a taxonomy database where each master taxonomy includes at least one piece of content placed at one or more locations. For example, the application(s) can be capable of defining a plurality of master taxonomies, and thereafter placing each piece of content at one or more locations within at least one of the master taxonomies to thereby provide the master taxonom(ies). In such instances, the application(s) can be capable of placing each piece of content such that at least one piece of content is placed at one or more locations within at least two taxonomies.

Irrespective of how the application(s) provide the master taxonom(ies), the application(s) can identify a subset of the pieces of content and at least one master taxonomy, where the subset includes at least one piece of content. Thereafter, the application(s) can then generate at least one client taxonomy based upon the identified subset of the pieces of content and the master taxonom(ies) such that the subset of the pieces of content can thereafter be organized in the client taxonom(ies). For example, the application(s) can be capable of generating the client taxonom(ies) by selecting at least one master taxonomy, identifying the at least one piece of content in the subset of the pieces of content, and thereafter pruning other pieces of content from the master taxonom(ies). In such instances, the client taxonom(ies) can include the piece(s) of content in the subset of the pieces of content. Then, after generating the client taxonom(ies), the application(s) can be further capable of providing the subset of the pieces of content and the client taxonom(ies) to a client. In such instances, the system can further include a client capable of operating an access application. The access application, then, can be capable of organizing the subset of the pieces of content in the client taxonom(ies).

More particularly, the application(s) can be further capable of assembling a content-record collection identifying a subset of the pieces of content, and a taxonomy-record collection identifying at least one master taxonomy. Then, the application(s) can be capable of identifying the subset of the pieces of content and the master taxonom(ies) from the content-record collection and the taxonomy-record collection, respectively. In one typical scenario, the application(s) can be capable of assembling a content-record collection and taxonomy-record collection for each of a plurality of clients. Then, the application(s) can select a content-record collection from the plurality of record collections, and a taxonomy-record collection from the plurality of record collections. The subset of the pieces of content and master taxonom(ies) can then be identified from the selected content-record collection and the selected taxonomy-record collection, respectively.

According to other aspects of the present invention, a method and computer program product are provided for managing and organizing pieces of content. As indicated above and explained below, embodiments of the present invention are capable of maintaining a plurality of pieces of content, different subsets of which can be placed within one or more of plurality of different master taxonomies. Thus, the same or different subsets of content can be thereafter provided to different clients, which can thereafter organize the same or different subsets in one or more different manners based upon client taxonom(ies) generated based upon the subsets and the master taxonomies. Thus, embodiments of the present invention permit different clients to organize a collection into different taxonomies without requiring the clients or the source of the collection to manually organize the materials, or manually place additional materials within a manually organized collection. Therefore, embodiments of the present invention solve the problems identified by prior techniques and provide additional advantages.

BRIEF DESCRIPTION OF THE DRAWINGS

Figure 1:
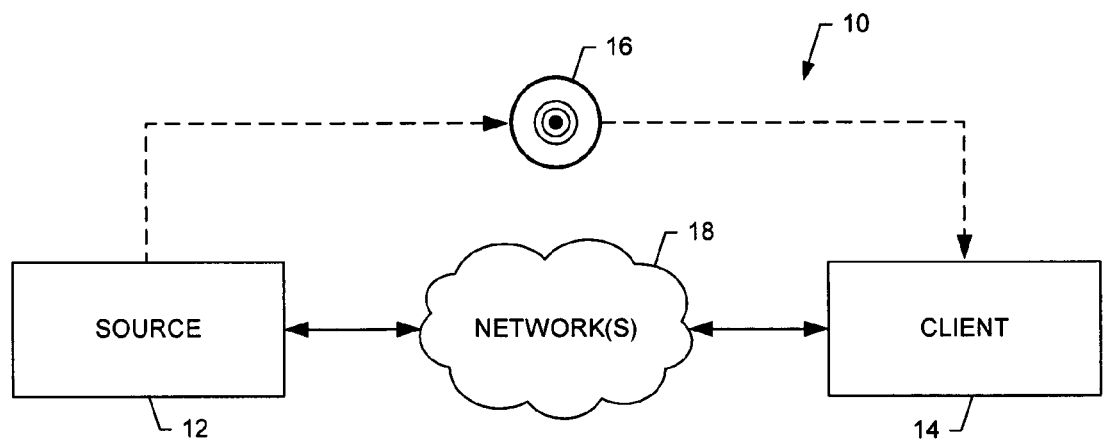
Figure 2:
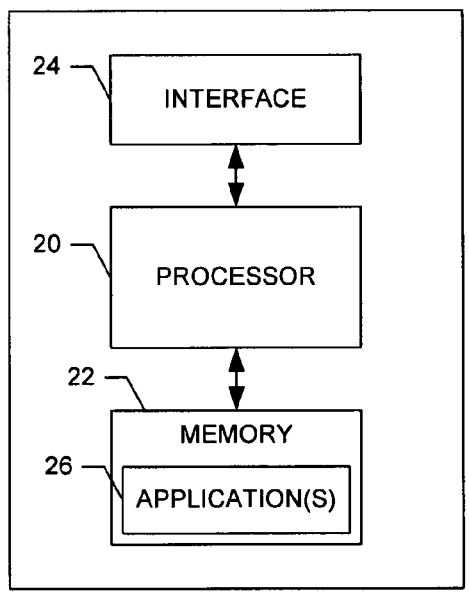
Figure 3:
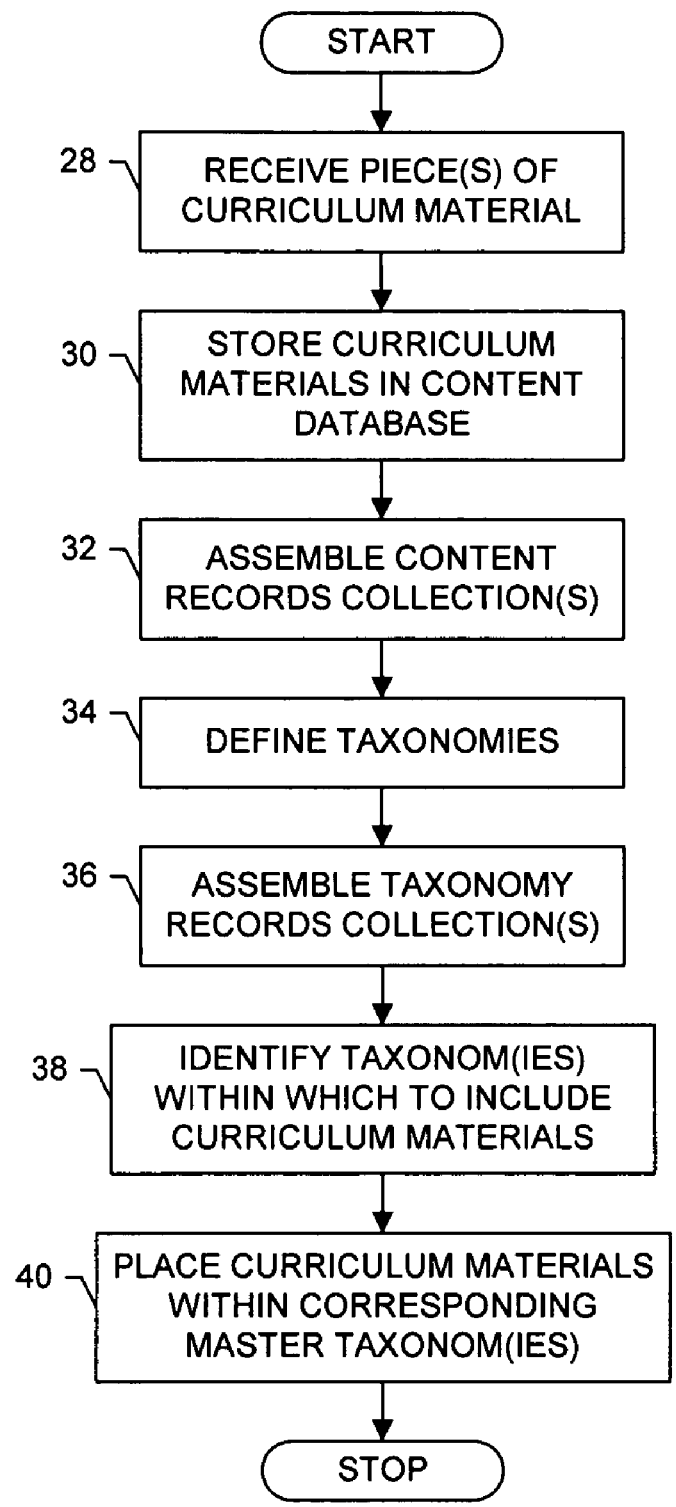
Figure 4:
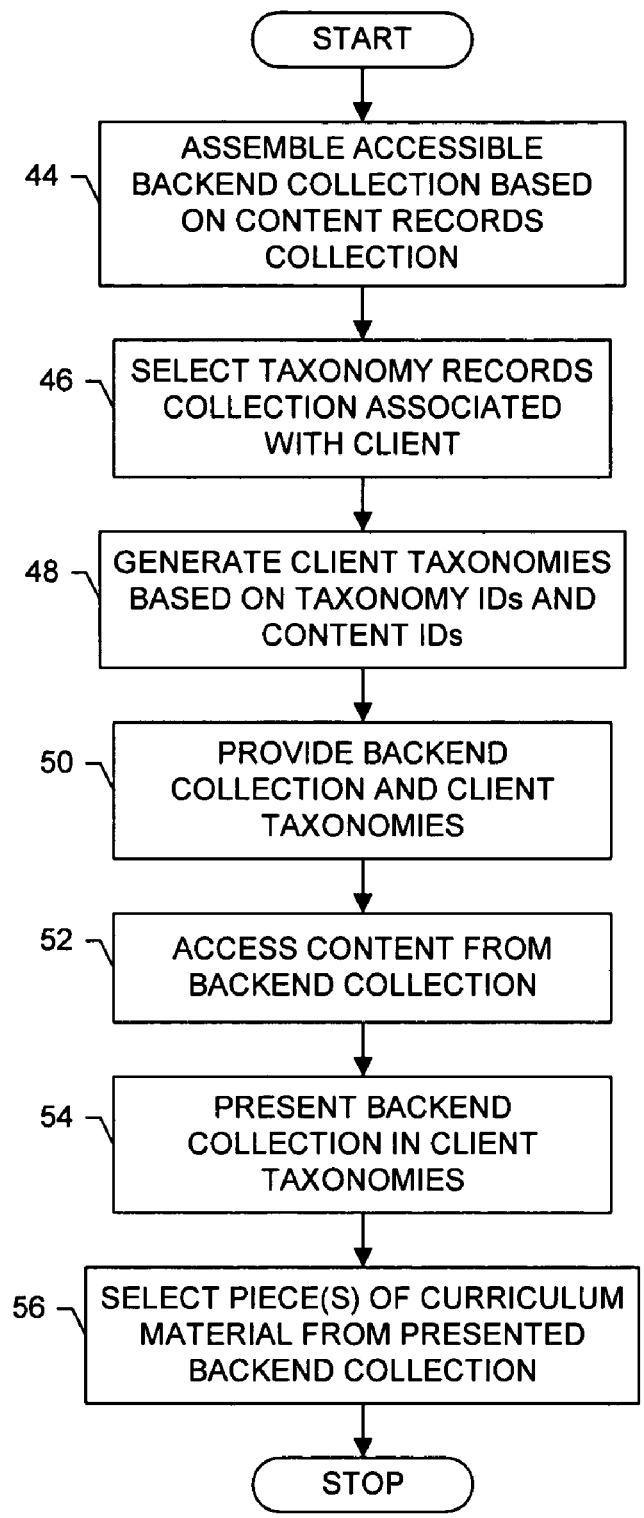

Having thus described the invention in general terms, reference will now be made to the accompanying drawings, which are not necessarily drawn to scale, and wherein:

FIG. 1 is a block diagram illustrating a system of organizing pieces of content, in accordance with one embodiment of the present invention;

FIG. 2 is a block diagram of an entity capable of operating as a source and/or client, in accordance with one embodiment of the present invention;

FIG. 3 is a flowchart illustrating various steps in a method of a method of managing pieces of content such that those pieces of content can thereafter be organized into one or more taxonomies, in accordance with an embodiment of the present invention; and FIG. 4 is a flowchart illustrating various steps in a method of a method of organizing content, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for representing hierarchically-structured content, and accessing content based on the representation, includes one or more sources 12 of content and clients 14 (one of each being shown). Each source 12 of content is capable of directly and/or indirectly communicating with one or more clients 14. Similarly, each client 14 may be capable of directly and/or indirectly communicating with one or more sources 12. For example, one or more sources 12 can be capable of providing content to one or more clients 14, the content being stored on a removable electronic storage medium 16 (e.g., DVD). Additionally or alternatively, for example, one or more sources 12 can be capable of providing content to one or more clients 14 across one or more networks 18. The network(s) can comprise any of a number of different combinations of one or more different types of networks. For example, the network(s) can include one or more data networks, such as a local area network (LAN), a metropolitan area network (MAN), and/or a wide area network (WAN) (e.g., Internet), and include one or more wireline and/or wireless voice networks, including a wireline network such as a public-switched telephone network (PSTN), and/or wireless networks such as IS-136 (TDMA), GSM, and/or IS-95 (CDMA). For purposes of illustration, however, as described below, the network comprises the Internet (i.e., WAN) unless otherwise noted.

The source 12 and client 14 can comprise any one or more of a number of different entities, devices or the like capable of operating in accordance with embodiments of the present invention. In this regard, one or more of the source 12 and client 14 can comprise, include or be embodied in one or more processing elements, such as one or more of a laptop computer, desktop computer, server computer or the like. Additionally or alternatively, one or more of the source 12 and client 14 can comprise, include or be embodied in one or more portable electronic devices, such as one or more of a mobile telephone, portable digital assistant (PDA), pager or the like. For example, the source 12 and client 14 can each comprise a processing element capable of communicating with one another across the Internet (e.g., network 18). It should be understood, however, that one or more of the source 12 and client 14 can comprise or otherwise be associated with a user carrying out one or more of the functions of the respective entity. Thus, as explained below, the term "source" can refer to a source and/or source user, and vice versa. Similarly, the term "client" can refer to a client and/or client user, or vice versa.

Referring now to FIG. 2, a block diagram of an entity capable of operating as a source 12 and/or client 14 is shown in accordance with one embodiment of the present invention. Although shown as separate entities, in some embodiments, one or more entities may support both the source 12 and a client 14, logically separated but co-located within the entit (ies). In this regard, a source 12 may be capable of performing one or more functions of a client 14. Additionally, or alternatively, a client 14 may be capable of performing one or more functions of a source 12.

As shown, the entity capable of operating as a source 12 and/or client 14 can generally include a processor 20 connected to a memory 22. The processor 20 can also be connected to at least one interface 24 or other means for transmitting and/or receiving data, content or the like. In this regard, the interface(s) can include a user interface that can include a display and a user input interface. The user input interface, in turn, can comprise any of a number of devices allowing the entity to receive data from a user, such as an electronic scanner, keyboard, mouse and/or any of a number of other devices components or the like capable of receiving data, content or the like.

The memory 22 can comprise volatile and/or non-volatile memory, and typically stores content, data or the like. In this regard, the memory 22 typically stores software applications 26, instructions or the like for the processor 20 to perform steps associated with operation of the entity in accordance with embodiments of the present invention. For example, as explained below, when the entity comprises a client 14, the memory can store one or more software applications associated with the client 14, such as an access application for accessing content provided by the source 12.

When the entity comprises a source 12, the memory 22 can store, for example, one or more software applications associated with the source 12, such as a content manager for managing content stored or otherwise under the control of the source 12. Also, for example, the memory 22 can store a taxonomy manager for organizing pieces of content into different taxonomies. Also, for example, the source 12 can store one or more databases such as a user database, a content database, a master taxonomy database and a metadata database. In this regard, the user database can store, for each of a plurality of users, information relating to the pieces of content the user is licensed or otherwise authorized to access, as well as one or more taxonomies with which the user desires to have the authorized pieces of content organized. The content database can store a plurality of pieces of content available from the source. The master taxonomy database can store one or more taxonomies, such as those taxonomies associated with the users in the user database. And the metadata database can store, for each of a plurality of pieces of content in the content database, one or more taxonomies within which the piece of content is capable of being organized, as well as one or more locations of those pieces of content within the respective taxonom(ies).

In accordance with embodiments of the present invention, the source 12 is generally capable of providing one or more pieces of content from the content database to one or more clients 14, the pieces of content being managed by a content manager (i.e., software application 26) capable of operating on the source 12. For example, the source 12 can be capable of providing one or more textbooks, journals, videos and/or treatises in one or more readily accessible collections, the collection(s) capable of differing for different clients. In such instances, the collection(s) can be characterized as including a plurality of curriculum materials that the respective user(s) utilize. It should be understood, however, that curriculum materials are only one of a number of different types of content, information, data or the like that the source 12 is capable of providing to the client(s) 14. Thus, as used herein, the terms "curriculum materials," "content," "information," and "data" can be used interchangeably to refer to that provided by the source 12 to the client(s) 14.

Briefly, and as explained below, before providing pieces of content to a client 14, the source 12 is capable of organizing the pieces of content into one or more taxonomies. Advantageously, the same pieces of content can be organized in one or more different taxonomies for the same client 14 and/or for different clients 14. Thus, the client 12 can be capable of thereafter accessing pieces of content already organized in one or more taxonomies desired by the client 12, without requiring the client 12 to manually organize the pieces of content.

To organize pieces of content for a client 14, the source 12 is capable of operating a taxonomy manager (i.e., software application 26), where the taxonomy manager is capable of identifying a plurality of pieces of content and one or more taxonomies, associated with the client 14. Thereafter, the taxonomy manager can generate one or more client taxonomies based upon the pieces of content and taxonom(ies) identified as being associated with the client 14. The client taxonom(ies), as well as the pieces of content (or a link or other instructions to receive the pieces of content), can be delivered to the client 14. The client 14, which is capable of operating an access application (i.e., software application 26), can then receive the client taxonom(ies) and pieces of content, and can thereafter be capable of accessing the pieces of content organized in accordance with the client taxonom(ies).

As described herein, the content manager, taxonomy manager and access application each comprise software (i.e., software application 26) capable of operating on the source 12 and client 14, respectively. It should be understood, however, that one or more of the content manager, taxonomy manager and access application can alternatively be embodied in firmware, hardware or the like. Further, although the content manager and taxonomy manager are shown and described herein as operating on the source 12, it should be understood that one or both of the content manager and the taxonomy manager can be capable of operating on an entity (e.g., personal computer, laptop computer, server computer, etc.) distributed from, and in communication with the source 12, such as across the Internet (i.e., network 18). Similarly, the access application can be capable of operating on an entity (e.g., personal computer, laptop computer, server computer, etc.) distributed from, and in communication with the client 14.

Reference is now made to FIG. 3, which illustrates a flowchart of a method of managing pieces of content such that those pieces of content can thereafter be organized into one or more taxonomies. The method includes the source 12 or more particularly the content manager (i.e., software application 26), receiving one or more pieces of content, such as one or more pieces of curriculum materials, as shown in block 28. In one advantageous embodiment for providing curriculum materials, for example, the content manager is capable of receiving curriculum materials via a user input interface (i.e., interface 24) of the source. After receiving the curriculum materials, the content manager can format and digitize the curriculum materials. Thereafter, the content manager can facilitate a source user in structuring the curriculum materials, or otherwise structure the curriculum materials. For example, the content manager can structure or otherwise mark-up the curriculum materials in accordance with the Extensible Markup Language (XML). It should be understood, however, that the content manager can structure the curriculum materials in accordance with any of a number of other markup languages, formats or the like.

After the content manager (i.e., software application 26) of the source 12 receives the curriculum materials, typically after the content manager structures or marks up the curriculum materials, the content manager can store the curriculum materials in the content database (i.e., memory 22) of the source 12, as shown in block 30. The content manager can index the curriculum materials in the content database in any of a number of different manners, but in one typical embodiment the content manager indexes the curriculum materials by a content ID uniquely associated with each piece of curriculum material. For example, various pieces of curriculum material can be such as the International Standard Book Number (ISBN) for those pieces including such an identifier, with other pieces of curriculum material being assigned a content ID similar to an ISBN.

Having received the curriculum materials, the content manager (i.e., software application 26) of the source 12 can assemble one or more "content-record collections," each identifying a subset of the curriculum materials, the subset including one or more pieces of curriculum materials of particular interest to one or more client users, as shown in block 32. In one typical scenario, the subset curriculum materials of interest to a plurality of different client users are stored in the content database (e.g. memory 22) of the source 12. In such instances, the content manager can generate one or more content-record collections, which can be stored in the user database (i.e., memory 22) and associated with respective user(s).

To generate a content-record collection, the content manager (i.e., software application 26) of the source 12 can first assemble or otherwise receive a list of the subset of one or more pieces of curriculum materials desired by or otherwise of particular interest to one or more client users. For example, for client users comprising students of an anatomy class, the list of curriculum materials may include the textbook, ANATOMY OF THE HUMAN BODY by Henry Gray. Additionally, or alternatively, the list of curriculum materials may include other text, video and/or audio content of particular interest to such students. Irrespective of the piece(s) of curriculum materials listed, for the listed piece(s) of curriculum materials, the content manager can thereafter add the listed piece(s) of curriculum materials, or at least those listed piece(s) of curriculum materials that are stored in the content database (i.e., memory 22) of the source or otherwise obtainable, to a particular content-record collection. In this regard, once the content manager determines that a piece of curriculum material is stored in the content database or is otherwise obtainable, the content manager can retrieve and add the content ID corresponding to that piece of curriculum material to the respective content-record collection. Once completed, the respective content-record collection, including the content IDs of all available piece(s) of curriculum materials of interest to one or more client users, can be stored in the user database (i.e., memory 22) of the source 12 and associated with respective user(s).

Before, after or as the content manager (i.e., software application 26) of the source 12 receives and stores the curriculum materials, and assemble record collections for one or more client users, the taxonomy manager (i.e., software application 26) of the source 12 can facilitate a source user in defining one or more taxonomies, or otherwise receive and/or define one or more taxonomies, as shown in block 34. For example, the source 12, or more particularly the taxonomy manager (i.e., software application 26) can receive taxonomies such as the Dewey Decimal Classification, the Library of Congress Classification. Also, for example, the taxonomy manager can receive, define or otherwise facilitate the source user defining taxonomies based upon subject matter and/or genre. In yet another example, can receive, define or otherwise facilitate the source user defining taxonomies specific to one or more clients 14 or client users. Irrespective of how the taxonomies are received or defined, the taxonomy manager can store the taxonomies in the taxonomy database (i.e., memory 22) of the source 12. The taxonomies stored in the taxonomy database being referred to as "master taxonomies." And like the content in the content database, the master taxonomies in the taxonomy database can be indexed in any of a number of different manners, including by a taxonomy ID uniquely associated with each master taxonomy.

After the taxonomy manager (i.e., software application 26) of the source 12 facilitates the source user in defining one or more taxonomies, or otherwise receives and/or defines one or more taxonomies, similar to the content manager (i.e., software application 26), the taxonomy manager can assemble one or more "taxonomy-record collections," each identifying one or more taxonomies of particular interest to one or more client users, as shown in block 36. In one typical scenario, master taxonomies corresponding to the taxonomies of interest to a plurality of different client users are stored in the taxonomy database (e.g. memory 22) of the source 12. In such instances, the content manager can generate one or more taxonomy-record collections, which like the content-record collections, can be stored in the user database (i.e., memory 22) and associated with respective user(s). In this regard, the taxonomy can assemble the taxonomy-record collections in any of a number of different manners, such as in a manner similar to the content manager assembling the content-record collections, including adding the taxonomies to the taxonomy-record collections by the taxonomy IDs corresponding to the respective taxonomies.

Before, after or as the taxonomy manager (i.e., software application 26) of the source 12 receives, defines or otherwise facilitates the source user defining taxonomies, the source 12, the taxonomy manager can facilitate the source user in identifying one or more master taxonomies within which to include the pieces of curriculum materials stored in the content database (i.e., memory 22), as shown in block 38. Alternatively, the taxonomy manager can facilitate the source user in identifying one or more pieces of curriculum materials that fit within each master taxonomy. For example, consider a piece of curriculum material comprising the textbook ANATOMY OF THE HUMAN BODY by Henry Gray. In such an instance, the taxonomy manager can identify or facilitate the source user identifying that the textbook can be properly included within a taxonomy previously defined in accordance with the New York University (NYU) course catalog, and a taxonomy previously defined in accordance with subject matter.

The taxonomies within which to include the pieces of curriculum materials can be identified in any of a number of different manners. In one embodiment, for example, each piece of curriculum material has an entry in a metadata database, where the entries can be indexed, as before, by content ID (e.g., ISBN). In this regard, the entry for each piece of curriculum material can include information identifying the taxonomies within which to include the piece of curriculum material. For example, the entry for the textbook ANATOMY OF THE HUMAN BODY can include information identifying the NYU course catalog taxonomy and subject matter taxonomy stored in the taxonomy database (i.e., memory 22) of the source 12. Thus, the taxonomy manager (i.e., software application 26) of the source 12 can be capable of identifying the taxonomies for the pieces of curriculum materials from those taxonomies associated with the curriculum materials in the metadata database.

The taxonomy manager (i.e., software application 26) of the source 12 can then place or facilitate the source user placing the curriculum materials at one or more proper locations within the master taxonom(ies) corresponding to the identified taxonom(ies), as shown in block 40. Continuing the above example, then, the taxonomy manager can place or facilitate the source user placing the textbook with entries for the courses "Anatomy 101" and "Biology 400" in the master NYU course catalog taxonomy stored in the taxonomy database (i.e., memory 22). Also, the taxonomy manager can place or facilitate the source user placing the textbook with the entry for the subject "biology" in the master subject matter taxonomy. As can be seen, then, not only can a piece of curriculum material be placed at more than one location within a single master taxonomy, but can additionally or alternatively be placed within more than one master taxonomy.

The taxonomy manager (i.e., software application 26) of the source 12 can identify the placement or facilitate the source user identifying the placement of the curriculum materials in any of a number of different manners. In one embodiment, for example, the metadata database not only includes the taxonomies associated with each piece of curriculum material, but also includes one or more locations within the respective taxonomies to place the pieces of curriculum materials. Thus, in this embodiment, the taxonomy manager can place the curriculum materials at the location(s) associated with the respective pieces of curriculum materials in the metadata database.

As will be appreciated, the taxonomy manager (i.e., software application 26) of the source 12 can place the curriculum materials in the master taxonom(ies) in any of a number of different manners. In one embodiment, for example, each piece of curriculum material can be placed in the master taxonom(ies) by including the content ID of the piece of content at the appropriate location(s) within the respective master taxonom(ies). Thus, each master taxonomy can include the content IDs of all of the pieces of curriculum materials stored in the content database (i.e., memory 22) of the source 12 that are placed at one or more locations within the master taxonomy. The master taxonomies, including the content IDs of the curriculum materials at the appropriate location(s), can then be maintained in the taxonomy database (i.e., memory 22). As such, the taxonomy location(s) can be linked with the content stored in the content database (i.e., memory 22) by the respective content IDs.

As will be appreciated, at one or more instances the source 12, or more particularly the content manager (i.e., software application 26), may receive one or more additional pieces of curriculum material. In such instances, the content manager can function, as before, to receive and store the additional curriculum materials (see blocks 28 and 30). The content manager can then assemble record collections for one or more client users including the additional curriculum materials, or otherwise modify existing record collections to include the additional curriculum materials (see block 32). In addition, the taxonomy manager (i.e., software application 26) of the source 12 can function, as before, to identify one or more taxonomies within which to include the additional curriculum materials and place the additional curriculum materials within the respective master taxonomies (see blocks 38 and 40). Further, the taxonomy manager can create an entry in the metadata database (i.e., memory 22) for each additional piece of curriculum material (see block 42).

As will also be appreciated, at one or more instances the source 12, or more particularly the content manager (i.e., software application 26), may facilitate a source user in defining one or more additional taxonomies, or otherwise receive and/or define one or more additional taxonomies (see block 34). In these instances, the taxonomy can again operate, in a manner similar to before, to assemble one or more taxonomy-record collections (or modify existing taxonomy-record collections), identify one or more pieces of curriculum material to include within the additional taxonomies, and place the curriculum materials within the respective master taxonomies (see blocks 36, 38 and 40). Further, the taxonomy manager can create an entry in the metadata database (i.e., memory 22) for each respective piece of curriculum material to further include the additional taxonomies, or otherwise modify existing metadata entries to include the additional taxonomies (see block 42).

At one or more points in time, a client 14 or client user may desire to receive or otherwise access one or more pieces of curriculum material stored in the content database (i.e., memory 22) of the source 12. For example, a client user may desire to receive curriculum materials after purchasing the respective curriculum materials or a license to access the respective curriculum materials. In such instances, the client user may desire to access the curriculum materials in one or more taxonomies of interest to the client user. Referring now to FIG. 4, a method of organizing content includes the source 12, or more particularly the content manager (i.e., software application 26) of the source, assembling an accessible backend collection based upon the record collection associated with the client 14 or client user, as shown in block 44. The content manager can retrieve, from the user database (i.e., memory 22), the respective content-record collection including the content IDs within the content-record collection. Then, content manager can proceed to add the piece(s) of curriculum material corresponding to the content IDs to an accessible backend collection. Thereafter, if so desired, the content manager can store the backend collection in memory (i.e., memory 22) of the source.

As the client user may desire to access the curriculum materials in one or more taxonomies of interest to the client user, the content manager or taxonomy manager (i.e., software application 26) can select, from the user database (i.e., memory 22), the taxonomy-record collection associated with the client 14 or client user, such as before or after assembling the back end collection, as shown in block 46. By selecting the taxonomy-record collection associated with the client 14 or client user, the content/taxonomy manager can identify, in addition to the content IDs from the content-record collection, the taxonomy IDs of the taxonomies that are associated with the client 14 or client user.

After identifying the content IDs and taxonomy IDs, the content/taxonomy manager (i.e., software application 26) of the source 12 can generate one or more client taxonomies based upon the respective content IDs and taxonomy IDs, as shown in block 48. More particularly, the content/taxonomy manager can select, from the taxonomy database (i.e., memory 22) of the source 12, the master taxonomies corresponding to the taxonomy IDs in the respective taxonomy-record collection. As indicated above, the master taxonomies stored in the taxonomy database can include the content IDs of all of the pieces of curriculum materials stored in the content database (i.e., memory 22) of the source 12 that are placed, or otherwise fit, within the respective master taxonomies. Thus, as will be appreciated, the master taxonomies corresponding to the taxonomy IDs in the respective taxonomy-record collection may include content IDs of pieces of curriculum materials not desired by, or otherwise licensed to, the client user. In other words, the master taxonomies corresponding to the taxonomy IDs in the respective taxonomy-record collection may include content IDs not in the content-record collection associated with the client 14 or client user.

To generate the client taxonomies, then, the content/taxonomy manager (i.e., software application 26) of the source 12 can store a copy of the respective master taxonomies, such as in a temporary location in memory or in the user database associated with the client 14 or client user. Thereafter, the content/taxonomy manager can identify the content IDs of the pieces of curriculum materials associated with the client 14 or client user, and prune or otherwise remove the remaining content IDs from the respective master taxonomies, or more typically from the copy of the respective master taxonomies. In this regard, the remaining content IDs correspond to those pieces of curriculum material identified as being associated with the client 14 or client user to thereby generate the client taxonomies. By pruning the other content IDs from the copies of the master taxonomies, the generated client taxonomies include only those pieces or curriculum material, or more particularly the corresponding content IDs included in the respective content-record collection) desired by or otherwise licensed to the client user.

After assembling the back end collection including one or more pieces of curriculum material, and generating the client taxonomies defining the organization of those pieces of curriculum material, the source 12 can provide, or otherwise facilitate providing, the backend collection and client taxonomies, as shown in block 50. In this regard, the backend collection and client taxonomies can be provided in any of a number of different manners. For example, the backend collection and client taxonomies can be stored on a removable electronic storage medium such as a diskette, CD or, more typically, a DVD. The DVD(s) can then be provided to one or more client users, or more particularly, those client users particularly interested in the piece(s) of content materials of the backend collection in the respective client taxonomies stored on the respective DVD(s). Alternatively, for example, the backend collection and client taxonomies can be stored or otherwise maintained by the source 12 or another processor (e.g., server computer) accessible by one or more client users across one or more networks 18. For more information on such a technique for providing content, see PCT Patent Application Publication No. WO 02/17276 A1 entitled: System and Method for Providing a Curriculum Repository, filed Aug. 8, 2001, the contents of which are hereby incorporated by reference in its entirety.

As will be appreciated, in various instances a client 14 or client user may not have a taxonomy-record collection identifying one or more taxonomies. In such instances, the content/taxonomy manager (i.e., software application 26) of the source 12 can respond in any of a number of different manners. In one typical embodiment, for example, the content/taxonomy manager can select a default taxonomy, such as the Library of Congress Classification. The content/taxonomy manager can then operate in a manner similar to before after identifying the taxonomy IDs in the taxonomy-record collection. In this regard, the content/taxonomy manager can select the master default taxonomy from the taxonomy database (i.e., memory 22), and prune or otherwise remove the content IDs corresponding to pieces of curriculum material not identified as being associated with the client 14 or client user to thereby generate a client taxonomy (see block 48. The backend collection and generated client taxonomy can then be provided as before (see block 50).

Irrespective of how the source 12 provides backend collection and client taxonomies to the client 14 or client user, at one or more instances thereafter, one or more client users may desire to access one or more of the pieces of curriculum material in the backend collection, as shown in block 52. For example, the client user(s) may desire to access pieces of curriculum material via an access application (i.e., software application 26) capable of operating on the client 14, such as to view the pieces of content. In this regard, the access application can be provided by the source 12 along with the content (e.g., on the same DVD), and thereafter installed and executed to operate on the client 14 to access the pieces of curriculum material. Alternatively, the access application can be previously installed on the client 14 such that the access application need only be executed to operate on the client to access the pieces of content. However, before the client user(s) are permitted to access the encrypted pieces of content, the client 14, or more particularly the access application, may be required to perform a digital rights management (DRM) technique to gain access to the pieces of content. For more information on such as DRM technique, see U.S. patent application Ser. No. 10/860,627, entitled: SYSTEM, METHOD AND COMPUTER PROGRAM PRODUCT FOR PROVIDING DIGITAL RIGHTS MANAGEMENT OF PROTECTED CONTENT, filed concurrently herewith, the contents of which are hereby incorporated by reference in its entirety.

If the client user is authorized in accordance with the DRM technique (if desired), the access application (i.e., software application 26) of the client 14 can then access the pieces of curriculum content in the backend collection. In accessing the pieces of curriculum material, however, the access application is capable of reading the client taxonomies, and thereafter presenting the backend collection or more particularly the pieces of curriculum materials in the backend collection (or a listing of the curriculum materials in the backend collection) in the organization of each of the client taxonomies, as shown in block 54. The client 14 or client user can then select one or more pieces of the curriculum materials from the presented backend collection to thereby access the respective piece(s) of curriculum materials, as shown in block 56. For example, the access application can render the selected piece(s) of content for display to the client user.

As explained above, a number of the databases (i.e., memory 22) of the source 12 index pieces of curriculum materials and taxonomies by respective content and taxonomy IDs. The content manager and taxonomy manager (i.e., software application 26) of the source can then utilize these IDs during operation to generate and provide one or more client taxonomies to the client 14, the client taxonomies defining organizations for a backend collection. It should be appreciated, however, that instead of utilizing content and taxonomy IDs, the content manager and/or taxonomy manager can utilize the pieces of curriculum materials and master taxonomies themselves, without departing from the spirit and scope of the present invention.

According to one aspect of the present invention, all or a portion of the system 10 of embodiments of the present invention, such as all or portions of the source 12 and/or client 14 generally operates under control of one or more computer program products (i.e., content manager, taxonomy manager, access application, etc.). The computer program products for performing the methods of embodiments of the present invention each include one or more computer-readable storage mediums, such as the non-volatile storage medium, and computer-readable program code portions, such as a series of computer instructions, embodied in the computer-readable storage medium.

In this regard, FIGS. 3 and 4 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of block(s) or step(s) in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for managing and organizing content, the system comprising:
a source including a processor configured for operating at least one application, wherein the at least one application is configured for providing a plurality of pieces of multimedia content, wherein the at least one application is configured for providing a plurality of master taxonomies concurrently, each master taxonomy including at least one piece of multimedia content placed at at least one location, wherein the at least one application is also configured for identifying a subset of the plurality of pieces of multimedia content and at least one of the plurality of master taxonomies, the subset including at least one piece of multimedia content, and wherein the at least one application is configured for generating at least one client taxonomy representing a subset of the at least one master taxonomy based upon the identified subset of the pieces of multimedia content and the identified at least one master taxonomy such that the identified subset of the pieces of multimedia content can thereafter be organized in the at least one client taxonomy.

2. A system according to claim 1, wherein the at least one application is configured for defining a plurality of master taxonomies, and thereafter placing each piece of multimedia content at at least one location within at least one of the master taxonomies to thereby provide the at least one master taxonomy.

3. A system according to claim 2, wherein the at least one application is configured for placing each piece of multimedia content such that at least one piece of multimedia content is placed at at least one location within at least two taxonomies.

4. A system according to claim 1, wherein the at least one application is further configured for assembling a content-record collection identifying a subset of the pieces of multimedia content, and a taxonomy-record collection identifying at least one master taxonomy, and wherein the at least one application is configured for identifying the subset of the pieces of multimedia content and at least one master taxonomy from the content-record collection and the taxonomy-record collection, respectively.

5. A system according to claim 4, wherein the at least one application is configured for assembling a content-record collection and taxonomy-record collection for each of a plurality of clients, wherein the at least one application is also configured for selecting a content-record collection from the plurality of record collections, and a taxonomy-record collection from the plurality of record collections, and wherein the at least one application is configured for identifying the subset of the pieces of multimedia content and at least one master taxonomy from the selected content-record collection and the selected taxonomy-record collection, respectively.

6. A system according to claim 1, wherein the at least one application is configured for selecting at least one master taxonomy, identifying the at least one piece of multimedia content in the subset of the pieces of multimedia content, and thereafter pruning other pieces of multimedia content from the at least one master taxonomy to thereby generate the at least one client taxonomy, the at least one client taxonomy including the at least one piece of multimedia content in the subset of the pieces of multimedia content.

7. A system according to claim 1, wherein the at least one application is further configured for providing the subset of the pieces of multimedia content and the at least one client taxonomy to a client.

8. A system according to claim 7 further comprising:
a client configured for operating an access application, wherein the access application is configured for organizing the subset of the pieces of multimedia content in the at least one client taxonomy.

9. A method of managing and organizing content, the method comprising:
providing a plurality of pieces of multimedia content;
providing a plurality of master taxonomies concurrently, wherein each master taxonomy includes at least one piece of multimedia content placed at at least one location;
identifying a subset of the plurality of pieces of multimedia content and at least one of the plurality of master taxonomies, the subset including at least one piece of multimedia content; and
generating at least one client taxonomy representing a subset of the at least one master taxonomy based upon the identified subset of the pieces of multimedia content and the identified at least one master taxonomy such that the identified subset of the pieces of multimedia content can thereafter be organized in the at least one client taxonomy.

10. A method according to claim 9, wherein at least one of providing or receiving a plurality of master taxonomies comprises:
defining a plurality of master taxonomies; and
placing each piece of multimedia content at at least one location within at least one of the master taxonomies.

11. A method according to claim 10, wherein placing each piece of multimedia content comprises placing each piece of multimedia content such that at least one piece of multimedia content is placed at at least one location within at least two taxonomies.

12. A method according to claim 9 further comprising:
assembling a content-record collection identifying a subset of the pieces of multimedia content, and a taxonomy-record collection identifying at least one master taxonomy;
wherein identifying a subset of the pieces of multimedia content and at least one master taxonomy comprise identifying a subset of the pieces of multimedia content and at least one master taxonomy from the content-record collection and the taxonomy-record collection, respectively.

13. A method according to claim 12, wherein assembling a content-record collection and taxonomy-record collection comprise assembling a content-record collection and taxonomy-record collection for each of a plurality of clients, wherein the method further comprises:
selecting a content-record collection from the plurality of record collections, and a taxonomy-record collection from the plurality of record collections; and
wherein identifying a subset of the pieces of multimedia content and at least one master taxonomy comprise identifying a subset of the pieces of multimedia content and at least one master taxonomy from the selected content-record collection and the selected taxonomy-record collection, respectively.

14. A method according to claim 9, wherein generating at least one client taxonomy comprises:
selecting at least one master taxonomy;
identifying the at least one piece of multimedia content in the subset of the pieces of multimedia content; and
pruning other pieces of multimedia content from the at least one master taxonomy to thereby generate at least one client taxonomy, the at least one client taxonomy including the at least one piece of multimedia content in the subset of the pieces of multimedia content.

15. A method according to claim 9 further comprising:
providing the subset of the pieces of multimedia content and the at least one client taxonomy to a client such that the client is capable of organizing the subset of the pieces of multimedia content in the at least one client taxonomy.

16. A computer program product for managing and organizing content, wherein the computer program product comprises at least one computer-readable storage medium having computer-readable program code portions stored therein, the computer-readable program code portions comprising:
a first executable portion for providing a plurality of pieces of multimedia content;
a second executable portion for providing a plurality of master taxonomies concurrently, wherein each master taxonomy includes at least one piece of multimedia content placed at at least one location;

a third executable portion for identifying a subset of the plurality of pieces of multimedia content and at least one of the plurality of master taxonomies, the subset including at least one piece of multimedia content; and a fourth executable portion for generating at least one client taxonomy representing a subset of the at least one master taxonomy based upon the identified subset of the pieces of multimedia content and the identified at least one master taxonomy such that the identified subset of the pieces of multimedia content can thereafter be organized in the at least one client taxonomy.

17. A computer program product according to claim 16, wherein the second executable portion is adapted to provide the plurality of master taxonomies by defining a plurality of master taxonomies, and placing each piece of multimedia content at at least one location within at least one of the master taxonomies.

18. A computer program product according to claim 17, wherein the second executable portion is adapted to place each piece of multimedia content such that at least one piece of multimedia content is placed at at least one location within at least two taxonomies.

19. A computer program product according to claim 16 further comprising:
a fifth executable portion for assembling a content-record collection identifying a subset of the pieces of multimedia content, and a taxonomy-record collection identifying at least one master taxonomy;
wherein the third executable portion is adapted to identify the subset of the pieces of multimedia content and at least one master taxonomy from the content-record collection and the taxonomy-record collection, respectively.

20. A computer program product according to claim 19, wherein the fifth executable portion is adapted to assemble a content-record collection and taxonomy-record collection for each of a plurality of clients, wherein the computer program product further comprises:
a sixth executable portion for selecting a content-record collection from the plurality of record collections, and a taxonomy-record collection from the plurality of record collections; and
wherein the third executable portion is adapted to identify the subset of the pieces of multimedia content and at least one master taxonomy from the selected content-record collection and the selected taxonomy-record collection, respectively.

21. A computer program product according to claim 16, wherein the fourth executable portion is adapted to select at least one master taxonomy, identify the at least one piece of multimedia content in the subset of the pieces of multimedia content, and thereafter prune other pieces of multimedia content from the at least one master taxonomy to thereby generate at least one client taxonomy including the at least one piece of multimedia content in the subset of the pieces of multimedia content.

22. A computer program product according to claim 16 further comprising:
a fifth executable portion for providing the subset of the pieces of multimedia content and the at least one client taxonomy to a client such that the client is capable of organizing the subset of the pieces of multimedia content in the at least one client taxonomy.

23. A system according to claim 1, wherein the at least one application is further configured for directing storage of the identified subset of the pieces of multimedia content and the generated at least one client taxonomy on a removable electronic storage medium.

24. A method according to claim 9, further comprising:
storing the identified subset of the pieces of multimedia content and the generated at least one client taxonomy on a removable electronic storage medium.

25. A computer program product according to claim 16, further comprising:
a fifth executable portion for directing storage of the identified subset of the pieces of multimedia content and the generated at least one client taxonomy on a removable electronic storage medium.

26. A system according to claim 1, wherein the multimedia content includes textual content.

27. A system according to claim 1, wherein the multimedia content includes two or more types of content selected from the group consisting of textual content, graphical content, and video content.

28. A method according to claim 9, wherein the multimedia content includes textual content.

29. A method according to claim 9, wherein the multimedia content includes two or more types of content selected from the group consisting of textual content, graphical content, and video content.

30. A computer program product according to claim 16, wherein the multimedia content includes textual content.

31. A computer program product according to claim 16, wherein the multimedia content includes two or more types of content selected from the group consisting of textual content, graphical content, and video content.

32. A system according to claim 1, wherein the at least one client taxonomy includes less than all of the pieces of multimedia content associated with the at least one master taxonomy.

33. A method according to claim 9, wherein the at least one client taxonomy includes less than all of the pieces of multimedia content associated with the at least one master taxonomy.

34. A computer program product according to claim 16, wherein the at least one client taxonomy includes less than all of the pieces of multimedia content associated with the at least one master taxonomy.

* * * * *